March 23, 1971  C. DELORME  3,572,407

FLUID DISPENSING SHUT OFF VALVE ASSEMBLY

Filed Dec. 30, 1968

INVENTOR
CLIFFORD DELORME

BY

ATTORNEY

United States Patent Office 3,572,407
Patented Mar. 23, 1971

3,572,407
FLUID DISPENSING SHUT OFF VALVE ASSEMBLY
Clifford Delorme, St. James, Manitoba, Canada, assignor to Arnett Company Limited, Winnipeg, Manitoba, Canada
Filed Dec. 30, 1968, Ser. No. 787,739
Int. Cl. B65b 3/00, 3/06; B67c 3/00
U.S. Cl. 141—362                                10 Claims

ABSTRACT OF THE DISCLOSURE

A channel runs through the dispensing head and carries the rubber dispensing tube and a guide supports a plate shut off valve which is actuated by a weight cooperating with a release plate. The plate shut off engages the rubber tube and squeezes it shut into a semi-cylindrical recess.

---

This invention relates to new and useful improvements in fluid dispensing mechanisms, particularly dispensing mechanisms adapted to be used for the dispensing of fluid milk. Such devices normally include a container into which a milk container can be mounted, said milk container having a flexible rubber hose secured to the lower end thereof and extending downwardly through the dispensing head so that milk can be dispensed into a container such as a glass or cup.

It is conventional to have a shut off mechanism acting upon the rubber hose closing same off and an actuating mechanism actuated by passing the glass or cup thereagainst which releases the hose and allows fluid milk to flow downwardly into the glass or cup.

It is desirable to provide a shut off mechanism which is not only easily actuated by the pressure of a glass or cup but which also positively closes off the rubber hose or tube thus preventing any dripping from occurring.

The present device provides a combination actuating and shut off mechanism in which a weight bears against a valve plate and an actuating pad is engaged by the container such as a glass or cup to remove the action of the weight from the valve plate when fluid milk is being dispensed.

In summary, I use an angulated rod having a weight on the horizontal portion and an actuating pad on the vertical portion. The rod is pivotally mounted to the dispensing head at the junction between the portions and the vertical portion of the rod bears against a shut off plate thus urging it across the channel carrying the rubber tube and squeezing the tube into a semi-cylindrical recess on the front of the dispensing mechanism.

With the foregoing in view, and such other or further purposes, advantages or novel features as may become apparent from consideration of this disclosure and specification, the present invention consists of the inventive concept which is comprised, embodied, embraced or included in the method, process, construction, composition, arrangement of parts, or new use of any of the foregoing, herein exemplified in one or more specific embodiments of such concept, reference being had to the accompanying figures in which.

In the drawings like characters of reference indicate corresponding parts in the different figures.

Figure 1:
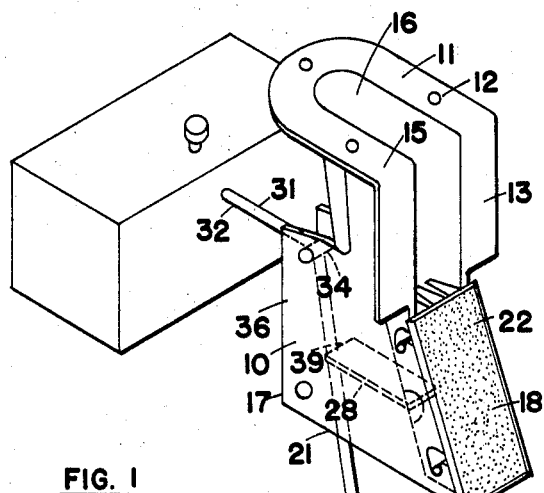
FIG. 1 is an isometric view of the shut off valve assembly and dispensing head.

Proceeding therefore to describe the invention in detail, reference should be made to the accompanying drawings which shows the shut off valve assembly and dispensing mechanism per se.

This is usually bolted to the underside of a conventional refrigerating cabinet holding the container of milk but this is not shown as it does not form part of the invention.

The assembly comprises a body portion collectively designated 10 having a substantially U-shaped upper flange portion 11 by which it is secured to the underside of the cabinet (not illustrated) by screws extending through apertures 12.

Vertical flanges 13 extend downwardly from the forward ends 15 of the flange 11 and these vertical portions 13 together with the flange 11 define the substantially U-shaped semi-cylindrical tube carrying channel 16 which extends clear through the body portion 10 inclining slightly from the rear side 17 thereof towards the front side 18 as clearly shown in the drawings.

This channel receives the rubber dispensing tube 19 which is secured to the underside of the fluid milk container and the lower end 20 of this tube extends below the base 21 of the body portion and forms the dispensing end of the tube.

Figure 2:
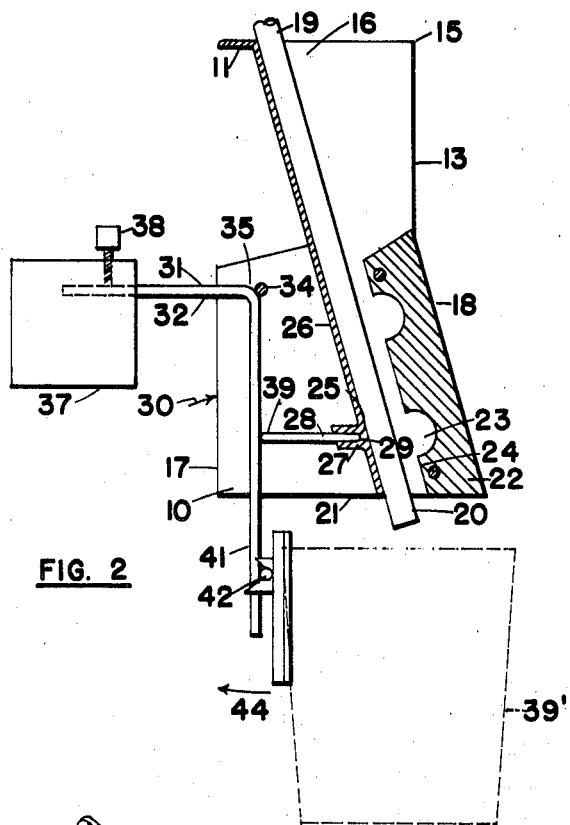
FIG. 2 is a vertical section of FIG. 1 showing the tube in the dispensing position.

A front plate assembly 22 closes the front of the tube carrying channel 16 and this plate is provided with a transversely situated semi-cylindrical recess 23 formed upon the inner face 24 thereof as clearly shown in FIG. 2.

A slot 25 is formed through the rear wall 26 of the channel 16 within the body portion and a pair of spaced and parallel bearing flanges 27 extend rearwardly from the boundaries of this slot and act as a bearing to mount a substantially rectangular valve plate 28 for horizontal fore and aft movement.

Figure 3:
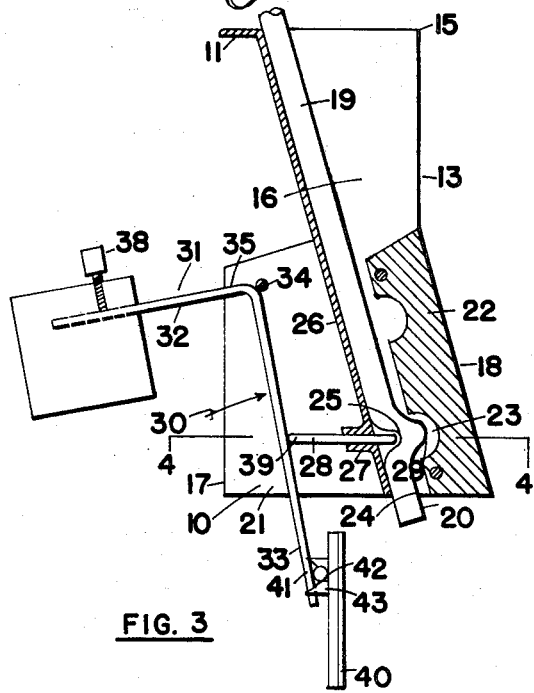
FIG. 3 is a view similar to FIG. 2 but showing the tube in the shut off position.
Figure 5:
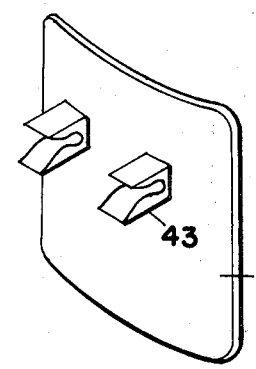
FIG. 5 is an isometric view of the actuating pad per se.
Figure 4:
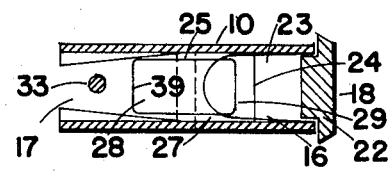
FIG. 4 is a horizontal section substantially along the line 4—4 of FIG. 3.

This plate is freely mounted within the slot 25 and the front end 29 of this plate can extend across the channel 16 to squeeze the tube 19 into the recess 23 as shown in FIG. 3.

This closes off the tube and prevents milk from being dispensed therefrom. Means are provided to maintain the plate valve 28 in the position shown in FIG. 3 under shut off conditions and further means are provided in combination with the aforementioned means to release this plate when it is desired to dispense milk through the tube 19.

Reference character 30 generally indicates a combination release and shut off mechanism consisting of an angulated rod 31 formed with a horizontal portion 32 and a vertical portion 33. A transverse rod 34 is welded to the junction 35 between these portions and extend into the side plates 36 forming the rear portion of the body portion 10. This mounts the rod assembly for pivotal movement around the horizontal rod 34.

A weight 37 is secured to the rear end of the horizontal portion 32 of the rod by means of clamp screws 38 and the vertical portion 33 of the rod bears against the rear end 39 of the plate valve 28 so that the weight normally urges the plate 28 across the channel 16 thus squeezing the tube into the semicylindrical recess 23 as clearly shown in FIG. 3. The combination of the rectangular plate and the semi-cylindrical recess 23 causes an efficient shut off to the tube 19 and prevents any dripping from occurring.

When it is desired to dispense fluid into a glass or container indicated by reference character 39, the glass or container is pressed against an actuating pad 40 secured to the lower end 41 of the vertical portion 33.

A transverse rod 42 is welded to the lower end and the pad 40 is formed from an arcuately curved sheet of plastic material with attaching lugs 43 formed on the rear side thereof. These snap over the rod 42 thus holding the pad firmly in position but permitting limited vertical angular adjustment to suit the container being pressed thereagainst.

The leverage action is such that relatively little pressure is required in the direction of arrow 44, by the container 39, to raise the weight 37 sufficiently to enable the pressure of fluid within the tube 19 to open same and flow from the dispensing end 20.

As soon as the container 39 is removed from the pad 40, the weight 37 snaps the plate valve 28 across the channel into the recess thus shutting off the tube 19 immediately.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. In a fluid dispensing apparatus which is adapted to dispense fluid from a container through a rubber tube or the like; the improvement which comprises in combination a body portion, a tube carrying channel extending downwardly clear through said body portion, and a combination shut off and actuating mechanism mounted on said body portion, said shut off and actuating mechanism including a shut off valve plate, means in said body portion mounting said plate for substantially horizontal movement, one end of said valve plate extending into said channel, a semi-cylindrical recess on the front wall of said channel, said one end of said plate squeezing the tube into said semi-cylindrical recess to shut off said tube, an actuating rod for said plate, said rod having a weight on one end normally holding said plate across said channel, a release pad on the other end of said rod engageable by the associated container into which fluid is dispensed, and movable against the action of said weight to remove the action of said weight against said valve plate.

2. The improvement according to claim 1 in which said actuating rod includes a substantially horizontal weight carrying portion and a substantially vertical release pad carrying portion, said rod being pivoted to said body portion adjacent the junction of said horizontal vertical portions.

3. The improvement according to claim 2 in which said pad includes means whereby said pad is angularly adjustable in a vertical plane and within limits, upon said vertical portion.

4. The improvement according to claim 2 in which said vertical portion bears against the inner end of said valve plate.

5. The improvement according to claim 3 in which said vertical portion bears against the inner end of said valve plate.

6. The improvement according to claim 1 in which said means on said body portion mounting said valve plate includes a horizontal slot in the rear wall of said tube carrying channel and upper and lower spaced and parallel drive flanges extending rearwardly of said channel wall bounding said slot.

7. The improvement according to claim 2 in which said means on said body portion mounting said valve plate includes a horizontal slot in the rear wall of said tube carrying channel and upper and lower spaced and parallel drive flanges extending rearwardly of said channel wall bounding said slot.

8. The improvement according to claim 3 in which said means on said body portion mounting said valve plate includes a horizontal slot in the rear wall of said tube carrying channel and upper and lower spaced and parallel drive flanges extending rearwardly of said channel wall bounding said slot.

9. The improvement according to claim 4 in which said means on said body portion mounting said valve plate includes a horizontal slot in the rear wall of said tube carrying channel and upper and lower spaced and parallel drive flanges extending rearwardly of said channel wall bounding said slot.

10. The improvement according to claim 5 in which said means on said body portion mounting said valve plate includes a horizontal slot in the rear wall of said tube carrying channel and upper and lower spaced and parallel drive flanges extending rearwardly of said channel wall bounding said slot.

References Cited
UNITED STATES PATENTS

| | | | |
|---|---|---|---|
| 404,192 | 5/1889 | Haas | 141—362 |
| 1,238,521 | 8/1917 | Janish | 251—7 |
| 2,284,252 | 5/1942 | Barreda et al. | 141—362 |
| 2,710,707 | 6/1955 | Persak | 141—362 |
| 2,718,985 | 9/1955 | Tamminga | 251—7 |
| 2,876,937 | 3/1959 | Wilson | 251—7 |
| 3,248,011 | 4/1966 | Brodsky et al. | 251—7 |
| 3,370,750 | 2/1968 | Deutch | 141—362 |

CARLTON R. CROYLE, Primary Examiner

J. J. VRABLIK, Assistant Examiner

U.S. Cl. X.R.

251—7